Jan. 2, 1945.   F. N. RAWLINGS ET AL   2,366,650
IONIC EXCHANGE OPERATIONS
Filed Jan. 14, 1942   4 Sheets-Sheet 4

INVENTORS
FRANKLIN N. RAWLINGS
LOUIS DE GEOFROY
BY
ATTORNEY

Patented Jan. 2, 1945

2,366,650

UNITED STATES PATENT OFFICE 2,366,650

IONIC EXCHANGE OPERATIONS

Franklin N. Rawlings, Westport, Conn., and Louis de Geofroy, New York, N. Y., assignors to The Dorr Company, New York, N. Y., a corporation of Delaware Application January 14, 1942, Serial No. 426,718

8 Claims. (Cl. 23—112)

This invention relates to improvements in the conduct of ionic exchange operations. More specifically, this relates to the use of cation exchangers operating in the hydrogen ion cycle. That is to say, it relates to the treatment of solutions from which cations are to be removed by means of a cation exchanger in exchange for H-ion, which exchangers must be regenerated after their exchange capacity has been exhausted and they have become saturated with cations from the solution being treated.

An ionic exchanger is usually represented in the form of a unit or cell containing a bed of the exchanger material proper which is usually granular. An exchanger has the ability to absorb from the solution an ion of an ionized solute and to give off into the solution in exchange an ion of another kind even though of like electric charge. Therefore, cation exchangers as a class exchange positively charged ions, whereas anion exchangers as a class exchange negatively charged ions.

As the solution is passed through and contacted with the ion exchanger bed, the direct exchange of respective ions between the solution and the exchanger continues until the exchanger is saturated with the ions being removed from the solution and its exchange capacity thus exhausted. The exchange capacity can then be restored by treatment of the exchanger with a suitable regenerant solution. The saturation on the one hand, and the regeneration on the other hand, represent the main phases of the operating cycle of an exchanger, whereby the exchanger may be used over and over again. The chemical reactions involved in the operating cycle are reversible equilibrium reactions.

More particularly the invention has to do with such beds that make use of granular exchanger material that is of organic nature and acid resistant to the extent that it will remain bodily stable in the presence of certain strong acids (for instance, HCl and $H_2SO_4$) by means of which they are to be regenerated. This belongs to a class of exchangers now newly called organolites in distinction from the inorganic base exchangers known as zeolites. Organolites are being used currently in sugar making, that is to say, in the purification phase of the sugar juice treatment, a use that will be described herein as an example by which to convey an understanding of the ionic environment of this invention. The essence of the method of purifying the juice or sugar bearing solution through ionic exchange treatment is that the juice is sent through a sequence of cation and anion exchangers, with the net result that dissolved salts in the juice are removed in exchange for the molar equivalent of pure and evaporable water. The mechanism of this ionic substitution in the treatment of sugar juice will be described more completely further below.

A cation exchanger of the organolite type, being of organic nature and acid resistant, can be regenerated with one of the commonly known strong acids of which HCl and $H_2SO_4$ are well known examples. While the sulphuric acid, being a cheaper one, may be considered preferable for reasons of economy, we have found its use to be impractical in the exchange treatment of solutions from which the cation exchanger has removed and collected cations among which are some that form with the regenerant sulphuric acid a poorly soluble or insoluble sulphate. Such a precipitate or deposit or coating upon the granules of the exchanger material presents an obstacle to the proper exchange function of the exchanger, and greatly reduces its effectiveness. In the specific case of ionic exchange purification treatment of some sugar bearing juices or syrups, calcium may be present in them to an objectionable degree and under ordinary conditions of exchange treatment, may collect in the exchanger to an extent that will cause undue quantities of insoluble calcium sulphate precipitate to deposit upon the exchanger material during regeneration with $H_2SO_4$.

The object of this invention is to overcome this difficulty and to propose a process which makes possible the use of sulphuric acid as an inexpensive regenerant, without the occurrence of the objectionable precipitates from the $H_2SO_4$ reaction with such trouble causing cations as calcium or others.

The invention proposes to isolate the undesirable or precipitate forming cations by means of selective or preferential ionic exchange, prior to applying $H_2SO_4$ as a regenerant to an exhausted cation exchanger. It is proposed to utilize certain selective or preferential exchange characteristics of the exchanger material. Such characteristics are in the nature of a certain order of exchange affinity possessed by the exchanger with respect to a variety of ionic substances present in the solution that is being treated by the exchanger. In other words, the cations in the solution form a sequence or series as regards their exchange affinity with respect to the exchanger. But it should also be understood that this natural sequence is modifiable in effect by a deliberate change of the concentrations of the respective ions in the solution. That is to say, the natural preference of the exchanger for one cation can be overcome or suppressed by another cation even though of weaker affinity with respect to the exchanger, provided it is allowed to act upon the exchanger in a sufficiently strong concentration.

The affinity characteristics of an exchange may be explained by way of general example as follows:

Assuming a solution contains a mixture of two salts "A" and "B" as solutes, and that the exchanger has a preference or affinity for the cation of the salt "A" over the cation of the salt "B," if the solution is passed through the exchanger bed that has been freshly regenerated, that bed will absorb all the cations from both the salts "A" and "B" indiscriminately in exchange for its own cations until it is substantially saturated with absorbed cations, that is until its exchange capacity is exhausted. This period is herein called the primary period of ionic exchange of the exchanger. If the same fresh solution is continued to be passed through the saturated exchanger, the latter will begin to manifest its selective characteristics by releasing the previously absorbed cation of the salt "B" in exchange for preferred cations of the salt "A" in the solution. This will continue until the exchanger is saturated with only the preferred cations of the salt "A."

Cation exchangers such as herein contemplated have a preferential action for the alkaline earths such as Ca and Mg over the alkaline metals such as represented by K and Na, all of which cations are found to be present in varying degrees in sugar juice.

That is to say, it has been found that ionic exchange materials operating in the hydrogen ion cycle have a preferential action or avidity for calcium on the one hand over potassium and sodium on the other hand. Thus, if an exchange bed is started operating on a solution containing all these cations, it will first remove all of them from the solution flowing through the exchanger bed. But when the bed reaches saturation, that is the exhaustion of its hydrogen exchange capacity, it will discontinue removing sodium and potassium from the solution and begin to exchange the already absorbed sodium and potassium for calcium in the incoming juice, and continue in this preferential exchange until substantially all of the sodium and potassium it has previously absorbed is replaced by calcium, whereby finally the exchanger bed is left Ca-saturated. In this secondary or preferential exchange reaction, the exchanger is, so to speak, operating in the sodium and potassium cycle instead of in the former hydrogen ion cycle.

For the same reason, if an exchanger is assumed to have been saturated with a series of cations of different affinities, it is possible to displace from the exchanger some of these ions, which have a weaker affinity to the exchanger than the displacing ion. In this way all ions can be displaced excepting the ion or ions having equal or greater affinity to the exchanger than the displacing ion.

For example, if a cation exchanger were saturated with Ca and K-ions, one could treat the exchanger with a $CaCl_2$-solution and thereby displace the K-ion with Ca-ion because of the natural preference of the exchanger for Ca. The solution is thereby changed to potassium chloride. Assuming all the K-ions to have been thus displaced, the exchanger would be left saturated with Ca-ions exclusively because of its preference for Ca over K. However, this natural preference of the exchanger for Ca may be overcome or suppressed by a suitable choice of concentration of a cation of lower affinity in solution, such as KCl. That is to say, with the K in sufficient concentration, when the Ca saturated exchanger is contacted with the KCl solution, all the Ca-ion in turn may be replaced with K-ion, whereby then the exchanger will be left all K-saturated.

In order to attain the object of this invention, the cation exchanger is allowed to become saturated with a variety of cations from a solution, including those ions that are potentially capable of forming undesirable precipitates on the exchanger material, when in reaction with $H_2SO_4$ during the subsequent regeneration of the exchanger with that acid. However, according to the invention, before applying this regenerant acid, the exchanger is first subjected to an ionic displacement operation by way of treating it with an auxiliary solution, whereby the precipitate forming ions are replaced with the molar equivalent of ions that will not form $H_2SO_4$ reaction products as precipitates. For example, a calcium containing cation exchanger may be treated with NaCl solution of sufficient strength until all the Ca in the exchanger has been replaced with Na, whereupon it may be regenerated with $H_2SO_4$ in the hydrogen ion cycle, whereby soluble sodium sulphate is produced. The spent regenerant liquor thus passes from the exchanger without leaving behind any harmful sulphate deposits.

Inasmuch as the ionic purification treatment of sugar juices is herein chosen as an example embodying this invention, and so that the environment of the invention thus embodied may be clearly understood, there now follows a brief description of the chemical exchange mechanism whereby ionic impurities or dissolved salts in the sugar juice are subtracted therefrom and replaced with the molar equivalent of pure and evaporable water.

In extracting non-sugars and especially salts from sugar-making juice or syrup, two main types of exchanger beds are used. One is called the cation exchanger bed that is characterized by its use of exchanger material that operates on the hydrogen-ion cycle and is adapted to collect from the juice plus or positively charged ions represented generally by calcium, magnesium, sodium and potassium. That is, as juice is supplied to the cation exchanger bed (or cell that contains the bed) so as to flow through it and out therefrom, cations of the juice exchange themselves for the hydrogen ions of the exchanger until the exchanger bed becomes exhausted of its exchange capacity and so saturated with those cations that it ceases substantially to exercise further hydrogen exchange activity. Thereupon the cation bed must be regenerated by contact with a regenerant in the form of an ionized strong acid such as hydrochloric or sulphuric acids. During regeneration, the reverse process takes place in the exchanger, namely, the residual cations exchange with hydrogen ions of the acid regenerant so that the cations flow from the bed until the bed is recharged with hydrogen ions.

Juice that passes from the cation bed has had its impurity content of basic ions substantially removed, but it yet contains chlorides, sulphates and other such negative ionic impurities. So the juice substantially rid of its positive ionic or cation impurities that have been left in the exchanger, is passed to and through an anion exchanger bed or cell that operates on a hydroxyl cycle. In passing through the anion bed, the chloride and sulphate, etc., ions of the juice are exchanged for the hydroxyl ions of the bed until the anion bed becomes saturated with chlorides and sulphates, etc. Thereupon the saturated anion bed must be regenerated by contact with some ionized alkali hydroxide or carbonate, especially sodium hydroxide or carbonate. During regeneration, the reverse process takes place, namely, the residual chloride and sulphate, etc., ions in the bed exchange with hydroxyl ions of the basic regenerant so that the negative ions or anions flow from the bed until the anion bed is re-charged with hydroxyl ions. In passing through the anion bed, the juice is substantially rid of its negative or salt-forming ions since they have been left in the exchanger. Thus, the acid or positive ions of the juice are removed from it while passing through a cation exchanger bed and the negative or acid forming ions are removed from it while passing through a subsequent anion exchanger bed.

This cation and anion exchange mechanism will be more precisely understood from the following example:

Sugar juice containing KCl goes into the cation bed, in passing through which KCl and HX (X being the structure of the cation exchanger) of the bed become KX and HCl. The HCl that flows from the cation bed with the juice is then passed through the anion bed and, in so doing, the incoming HCl and the OHY (Y being the structure of the anion exchanger of the anion bed) become ClY and water, so that sugar juice flows from the anion bed minus its initial content of KCl.

During the regeneration in the cation bed, if HCl is used as a regenerant, that acid reacts with the residual KX to form HX and KCl, the latter flowing from the cation bed leaving the bed regenerated. If $H_2SO_4$ be used as regenerant acid, the spent regenerant liquor would accordingly contain the K as $K_2SO_4$ which is a soluble sulphate. During regeneration of the anion bed, the incoming regenerant NaOH reacts with the ClY to form OHY and NaCl, which latter flows from the bed, leaving the anion bed regenerated.

Again, the problem lies with regeneration of the cation exchanger in view of the possibility of sulphate deposits on the exchanger material. Sulphuric acid being from one-third to one-fourth the price of hydrochloric acid, it is preferable naturally, to use sulphuric acid. Cane juice, for instance, contains sufficient calcium so that when sulphuric acid is used for regeneration, calcium sulphate is found or yielded in such concentration as to precipitate in the exchanger bed during regeneration. This precipitation tends to block mechanically the normal exchange function of the exchanger bed, causing a marked reduction in the exchange capacity of the regenerated cation exchanger.

This invention proposes, therefore, a method for avoiding the detrimental precipitation of calcium sulphate in cation exchangers operating in the H-ion cycle when sulphuric acid is used in the regeneration of those exchangers. The remedy according to this invention lies in subjecting the exchanger to an intermediate treatment or conditioning step whereby the Ca or precipitate forming cations are displaced from the exhausted exchanger by cations whose potential sulphates will remain dissolved in the spent regenerant liquor. This comprises treating an exhausted cation exchanger bed with a sufficiently strong solution of common salt (or its equivalent) to replace the Ca of the exchanger bed with Na from the salt. This auxiliary treatment step leaves the exhausted exchanger saturated mainly with Na and K, such being the representatives of the alkali metals and the alkaline earths respectively in the sugar juice. The exhausted cation exchanger bed thus conditioned or pre-regenerated in the Na cycle, can be safely regenerated in the H-ion cycle, that is, with sulphuric acid. Due to the absence of Ca in the exchanger, no insoluble calcium sulphate will form. The sulphates of Na and K that will form, are soluble and thus harmless to the proper functioning of the operating cycle of the exchanger bed.

According to one embodiment or mode of operation of this invention, the total exchange operating cycle is performed in two exchanger stages. That is to say, the juice is passed through a first cation exchanger stage operating in the auxiliary or Na regeneration cycle where all the Ca from the juice is selectively collected by, and then displaced from exchanger, whereupon the thus conditioned juice is passed through a second exchange stage operating in the H-ion regeneration cycle, where cations are removed that do not form insoluble $H_2SO_4$-reaction products.

In this connection it is to be remembered from the foregoing, that all the Ca from the juice can be selectively collected in the first exchanger stage because the cation exchangers have a much greater affinity for the calcium ions than for the sodium or potassium ions. That is to say, if the exchanger becomes first exhausted with a variety of any such cations collected in it, then if additional juice is contacted with it, the exchanger will, by reason of its preference, remove the Ca from the additionally flowing juice, yielding in exchange an equivalent quantity of sodium or potassium which it had previously removed and collected.

If a sufficient proportion of the cation exchanger (representing the first exchanger stage) is left in the circuit after the exchanger has become exhausted with respect to hydrogen ion exchange, and if this is followed by other cation exchanger not exhausted with respect to hydrogen ion exchange (this is the second exchanger stage) the exhausted exchanger stage will selectively take up all of the Ca while the non-exhausted exchanger stage will take up the K and Na. The first exchanger stage having become all Ca saturated, can be treated with a solution of sodium chloride (NaCl) of sufficient concentration in order to substantially remove the Ca from the exchanger by displacing it with Na. After washing out the residual NaCl from the bed, the exchanger can again be used to take up more Ca from the juice, and the Ca-free juice then be passed through second stage exchanger material active in the H-ion cycle in order to remove the K and Na. The exhausted second stage exchanger bed containing the K and Na is regenerated with $H_2SO_4$ because it doesn't contain precipitate forming impurities, and after washing out the residual acid from the bed, this second stage exchanger can again be used to effect Na- and K-removal, in sequence to the first stage exchanger bed or beds employed to remove the Ca alone from the juice.

In the course of a complete operating cycle, each of these exchangers, if exhausted, is to have the residual juice therein displaced from the exchanger bed with wash water, and if deposits have collected on the exchanger granules they are to be washed out, before the exchanger is subjected to contact with the regenerant solution. Again, if regeneration is completed, the residual regenerant is to be displaced and washed out from the exchanger with water, before the exchanger is again contacted with the juice. In this way undesirable reactions between ionic constituents of the juice and regenerant solution in the exchanger bed can be avoided and the exchanger be kept in regular cyclic operation with substantially undiminished efficiency.

The exhaustion or saturation of a fresh exchanger bed with the solution flowing downwardly therethrough proceeds in continuous fashion from the top to the bottom of the exchanger body. Hence, there exists, approximately speaking, a dividing line or relatively narrow zone of transition between the upper exhausted or saturated portion of the exchanger body and the lower non-exhausted or non-saturated portion of that body. This dividing line or zone keeps shifting downwardly through the exchanger body as the continuously through-flowing solution leaves an increasing exhausted exchanger portion behind as it advances through a correspondingly decreasing portion of non-exhausted or still active exchanger. However, as the dividing line is not necessarily a sharp one, there will be noticed a slowing down of the exchange intensity as the "break-through" point of the exchanger is being approached. This is a warning that the fresh or regenerated exchanger should be substituted for the one nearing saturation. The regeneration of a bed proceeds in a similar manner through the bed.

One of a variety of organic cation exchangers considered suitable for the present purpose is of the resinous type such as exemplified in the United States patent to Holmes No. 2,191,853, where the exchanger is described as a synthetic resin of the polyhydric phenol formaldehydic type which is sulphited to a degree such that its sulphur content is not less than 2.4%. An organic anion exchanger considered suitable for the present purpose is also of the resinous type and is exemplified in the United States patent to Adams and Holmes No. 2,151,883, describing the exchanger as an insoluble resin-like product obtained by the reaction of formaldehyde with an aromatic amine. Exchangers of the type contemplated for use in connection with the present invention, are substantially stable in the presence of acids and alkalis.

Other suitable organolite exchangers are: The cation exchanger produced by the Resinous Products Corp. of Philadelphia under the name or identification of Amberlite IR.1, and the anion exchanger Amberlite IR.4 from the same source. These are exchanger materials of synthetic resinous nature, and more specifically materials which are prepared by the condensation of a dissolved organic chemical of a group comprising sulfonated phenols and aromatic amines, with an aldehyde The invention possesses other objects and features of advantage, some of which, with the foregoing, will be set forth in the following description. In the following description and in the claims, parts will be identified by specific names for convenience, but they are intended to be as generic in their application to similar parts as the art will permit. In the accompanying drawings there have been illustrated the best embodiments of the invention known to me, but such embodiments are to be regarded as typical only of other possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Figure 1:
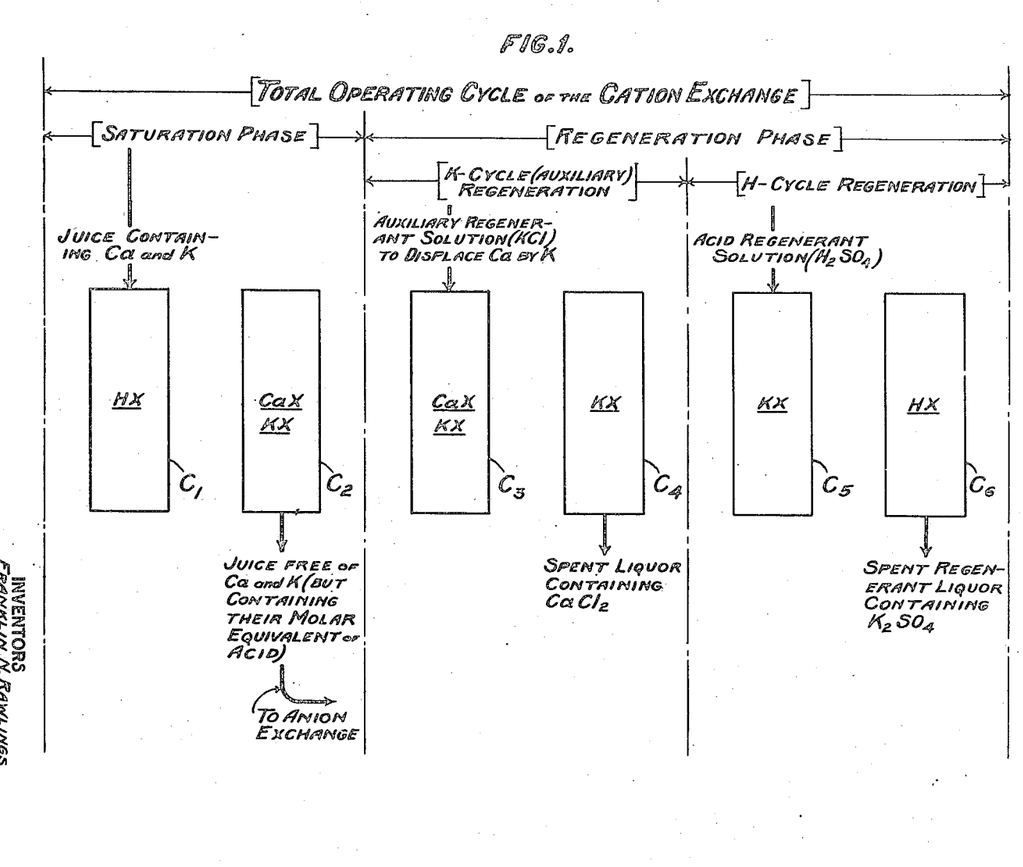
Fig. 1 is a diagrammatic illustration of the cyclic operation of the cation exchanger operating as a single exchanger stage, in which the intermediate or auxiliary regeneration step is in the K cycle.

In practicing the invention according to Fig. 1, the juice containing as chlorides Ca as well as K (as representatives of the alkali metals and of the alkaline earths respectively) is started flowing through a cation exchanger bed which is freshly regenerated in the H-ion cycle, a condition herein designated as $C_1$. The saturation of this bed by the through-flowing juice with Ca and K proceeds according to the following equation:

(1)

In due course the H-ion exchange capacity of the exchanger will become exhausted, as Ca and K from the juice accumulate therein in exchange for the available H-ion, this exchange reaction resulting in the formation of 4HCl (hydrochloric acid) in the juice. The exhausted or saturated condition of the exchanger at the end of the saturation phase is designated as $C_2$. The juice that is having its Ca and K removed by the exchanger, having thus become acidified in the process, is then passed on to and through an anion exchange treatment station where the negative ion of the acid is replaced with OH-ion which combines with the positive or H-ion of the acid to form pure water (HOH or $H_2O$). The dissolved salts or impurities ($CaCl_2$ and 2KCl) originally present in the juice, are thus replaced by the molar equivalent of pure water. Since this invention is concerned with improvements relating to the cation exchange treatment phase, the anion exchange station is not particularly shown in the drawings.

The exchanger having become saturated with Ca and K is then subjected to intermediate treatment or conditioning by auxiliary regeneration in the K-cycle. This proceeds according to the following equation:

(2)

This means that the exchanger is treated with KCl solution of sufficient strength to displace and replace the Ca, the initial condition of the exchanger during this treatment phase being designated as $C_3$. This is continued until all the Ca in the exchanger has been replaced with K, placing the exchanger in the condition designated as $C_4$. Thus the exchanger is all K-saturated, as the Ca is contained in the spent liquor as $CaCl_2$.

The exchanger can now be subjected to regeneration proper with $H_2SO_4$ of suitable concentration, that is, regeneration in the H-ion cycle, as represented in the following equation:

(3)

That is to say, $H_2SO_4$ is started flowing through the K-saturated exchanger bed, and the condition of the bed at the beginning of this phase is designated as $C_5$. This continues until all K-ion are replaced with H-ion, the K being yielded by the exchanger and therefore present in the spent regenerant liquor as $K_2SO_4$, that is, potassium sulphate that is soluble. Thereupon the exchanger can be re-used in the initial condition $C_1$ of the saturation phase, that is, at the beginning of the total operating cycle. Because of the absence of calcium sulphate deposits on the exchanger granules, this cycle can be maintained repetitively in smooth operation.

Figure 2:
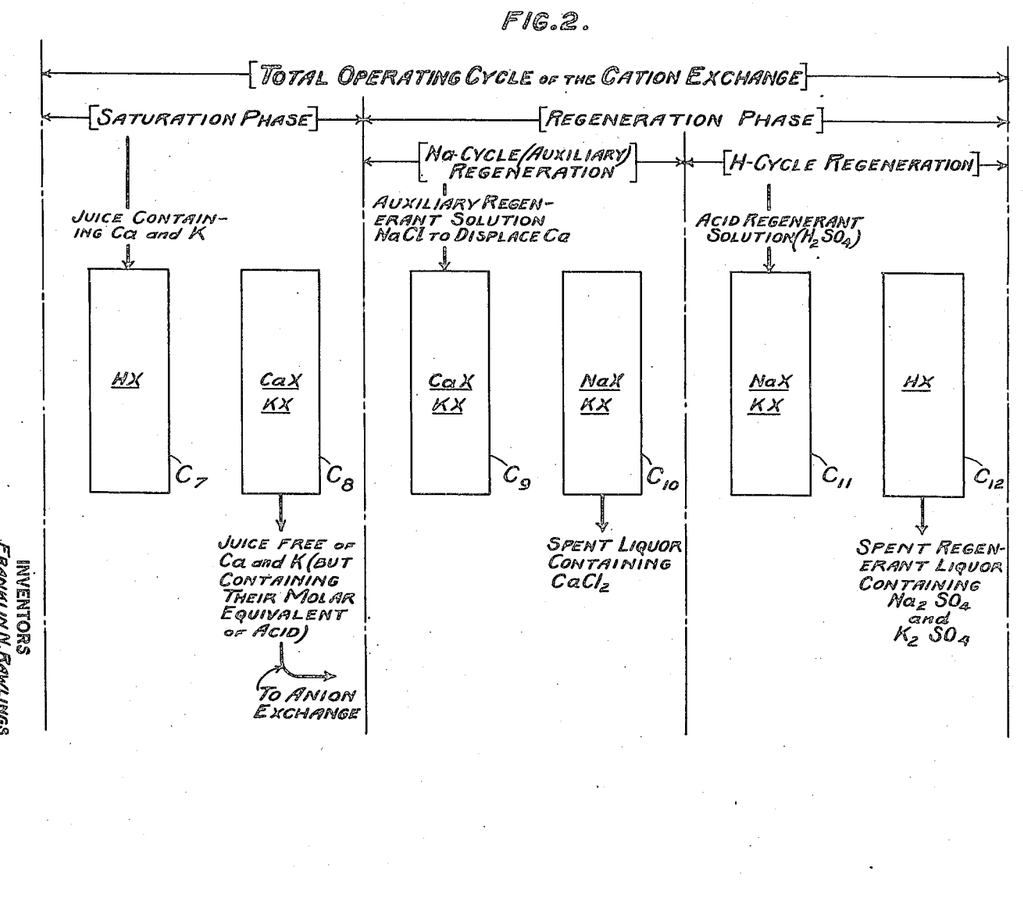
Fig. 2 is similar to Fig. 1, except that the intermediate regeneration is in the Na-cycle, leaving Na and K to be removed from the exchanger by H-ion cycle regeneration.
Figure 3:
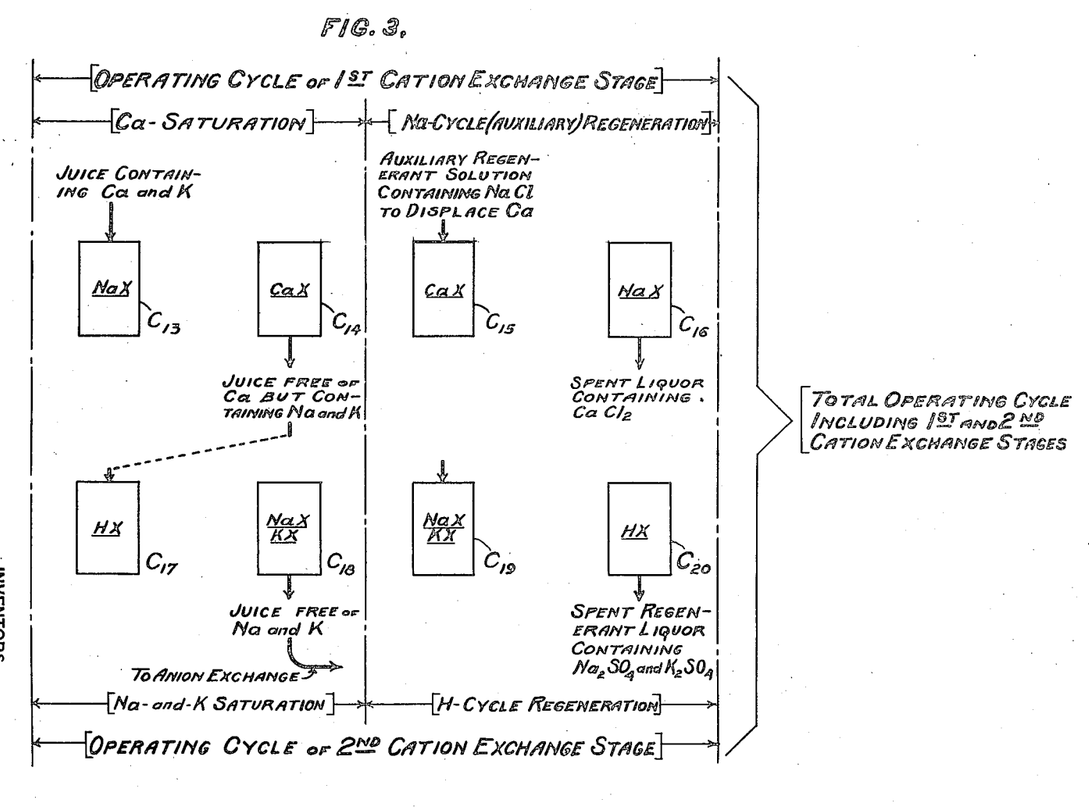
Fig. 3 illustrates the two-stage method in which the intermediate or auxiliary regeneration is performed in the Na cycle in the first exchanger stage, and the H-ion regeneration (using $H_2SO_4$) is performed in the second exchanger stage.

However, sodium chloride (NaCl) is a suitable and inexpensive auxiliary regenerant substance, and its use as such is embodied in the two methods of operation according to Fig. 2 and Fig. 3 respectively.

In Fig. 2, the saturation phase of the total operating cycle comprises starting the flow of juice containing Ca and K as chlorides, through a suitable cation exchanger which has been freshly regenerated in the H-ion cycle and therefore has positive or H-ions available for exchange. This condition of the exchanger is designated as $C_7$. As the flow of juice is continued the exchange reaction between the available H-ion in the exchanger with the Ca and K-ion in the juice proceeds according to the equation (1) as above. If this is continued until the available H-ions in the exchanger have been replaced with Ca and K-ion, the exchanger will have assumed the condition $C_8$ in which it is all Ca- and K-saturated. The juice leaving the exchanger is thus rendered free of Ca and K, although it becomes correspondingly acidified since it contains the combined Ca and K equivalent in hydrochloric acid. The thus acidified juice is passed to an anion treatment station (not shown in the drawings) where the acid is converted into the molar equivalent of $H_2O$, as was described in connection with the removal of cations from the juice during the saturation phase in Fig. 1.

The exchanger is then subjected to intermediate or auxiliary regeneration, namely, regeneration in the Na-cycle, with NaCl solution as the auxiliary regenerant. The condition of the exchanger bed at the beginning of this intermediate phase is designated as $C_9$, and it proceeds according to equation—

(4)

This is continued until all the Ca-ion in the exchanger will have been replaced with sodium ion. The condition of the bed at the end of this regeneration phase is designated as $C_{10}$.

Then begins the regeneration proper of the exchanger in the H-ion cycle by means of $H_2SO_4$, which proceeds according to equation—

(5)

The condition of the exchanger at the beginning of this final regeneration phase is designated as $C_{11}$. The exchange according to Equation (5) is continued until all Na and K-ion in the exchanger have been replaced with H-ion from the acid, when the exchanger bed will have reached its fully regenerated condition designated as $C_{12}$. Consequently, the displaced Na and K are present in the spent regenerant liquor as $Na_2SO_4$ and $K_2SO_4$. The exchanger bed is then ready to be re-used at the beginning of the operating cycle where its condition was designated as $C_7$.

In Fig. 3 the invention is embodied in a two-stage operating system, permitting the auxiliary (Na-cycle) regeneration to be performed in the first exchanger stage, while the H-ion regeneration (using $H_2SO_4$) is performed in the second exchanger stage. That is to say, the juice is passed sequentially through both stages, while each stage is regenerated in its own respective cycle. In the first stage the juice is conditioned, by virtue of selective Ca-removal, for H-ion exchange treatment in the second stage period. Because of the conditioning action of the first stage, the cations present in the juice entering into the H-ion exchange phase, are of such a kind that their $H_2SO_4$ reaction products will not form objectionable precipitates during H-ion regeneration of the second stage exchanger bed.

For this purpose, the first stage exchanger bed may be assumed to have been regenerated in the Na-cycle, so that it is saturated with Na-ion when juice containing Ca and K as chlorides is started flowing through it at the beginning of the operating cycle. The condition of the bed, when the juice begins to flow into it, is designated as $C_{13}$.

Since the exchanger has a preference for Ca over Na, it will absorb the Ca from the juice, releasing Na instead into the juice, rendering the juice thus treated free of Ca but leaving in it Na and K according to the following exchange reaction equation—

(6)

This exchange is continued until all Na-ion in the exchanger have been replaced with Ca-ion from the juice, that is, until the exchanger is all Ca-saturated, a condition herein designated as $C_{14}$. The Ca-free juice is then passed on to the second cation exchanger stage, while the first stage exchanger bed is being subjected to Na- cycle regeneration which proceeds according to equation—

(7)

That is to say, NaCl solution of sufficient strength is started to be passed through the bed then in a condition designated as $C_{15}$. The NaCl solution is of a strength sufficient to suppress the initial Ca preference of the exchanger and to effect displacement of the Ca-ion therefrom. Consequently, when all the Ca has been replaced with Na, the exchanger is all Ca-saturated and in a condition herein designated as $C_{16}$. The displaced Ca is present as $CaCl_2$ in the spent liquor flowing from the bed.

Meanwhile the juice having been freed of Ca, but containing Na and K, is passed through the second cation exchanger bed for the purpose of exchanging H-ion from the exchanger against the Na and K-ion from the juice.

At the beginning of this saturation phase the condition of the exchanger is designated as $C_{17}$. The saturation proceeds according to the equation—

(8)

The Na and K saturation of the exchanger according to equation (8) proceeds by continuing to flow juice through the exchanger until substantially all available H-ion therein have been exchanged against the Na and K-ion from the juice, when the exchanger will have become Na and K-saturated, a condition herein designated as $C_{18}$. The juice treated during this saturation phase emerges free of Na and K, although containing the combined Na and K equivalent in hydrochloric acid. The thus acidified juice is then passed on for treatment in an anion exchange station (not shown in the drawings) where the acid in the juice is converted to pure water, as above explained in connection with the operation according to Fig. 2 and Fig. 3.

The second stage exchanger bed can now be regenerated in the H-ion cycle by means of treating it with $H_2SO_4$ of suitable concentration. The condition of the bed, when the regenerant acid starts entering it, is designated as $C_{19}$. The exchange whereby the Na and K in the exchanger are replaced with H-ion from the acid, proceeds according to equation—

(9)

This is continued until all the Na and K will have been replaced with H-ion, when the exchanger will have reached its regenerated condition herein designated as $C_{20}$. Spent regenerant liquor flows from the exchanger, containing the displaced Na and K as $Na_2SO_4$ and $K_2SO_4$, both of which are soluble, and therefore harmless, since they leave no objectionable and obstructive deposits upon the exchanger material, whereby its exchange effectiveness might be interfered with. The thus regenerated exchanger can then be re-used at the beginning of the H-ion regeneration cycle, where the condition of the bed is identified as $C_{19}$.

Figure 4:
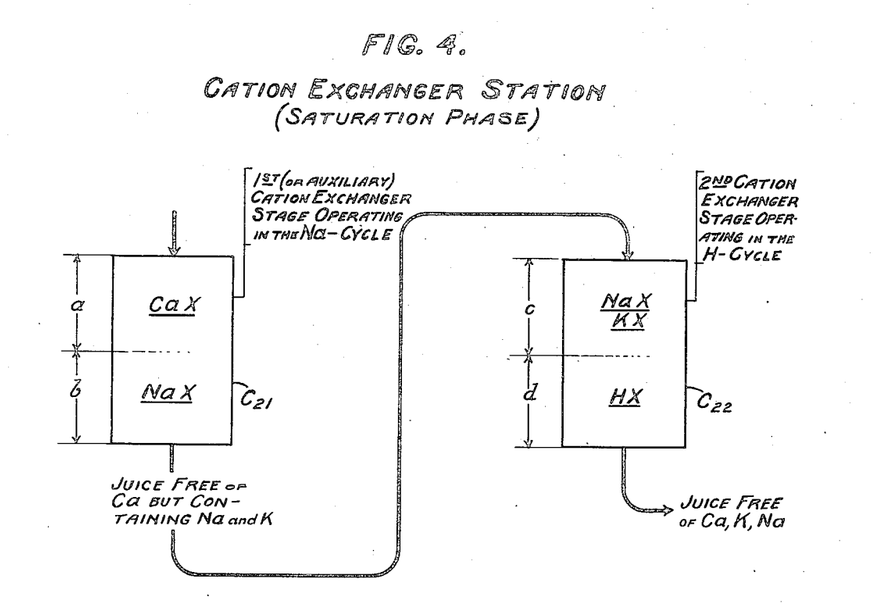
Figs. 4 and 5 illustrate the mode of operation or operating cycle shown in Fig. 3, by representing an intermediate condition in the operating phases of the two cation exchanger beds, namely, when the two beds are partly exhausted during the saturation phase (see Fig. 4), and partly regenerated in the regeneration phase (see Fig. 5).
Figure 5:
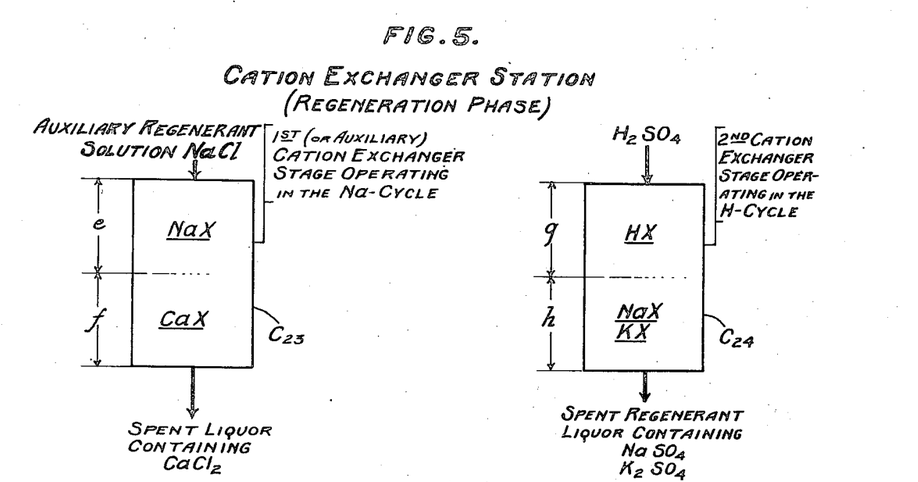

Another way of illustrating the method of isolating Ca from the juice according to Equations (6), (7), (8), (9) is shown in the diagrams of Figs. 4 and 5. Instead of showing the initial and final condition of the exchanger beds (as shown in Fig. 3, Figs. 4 and 5 show an intermediate condition of the beds in their saturation and regeneration phase respectively.

Fig. 4 shows the saturation of the two cation exchanger stages. The juice which is assumed to contain appreciable amounts of Ca and K in the form of chlorides and as representing the alkali metals and the alkaline earths respectively, is shown to have passed through the first cation exchanger stage long enough to have placed it into the condition designated as $C_{21}$. This bed was originally regenerated in the Na cycle whereby it has adsorbed Na-ion, but in the condition $C_{21}$ the upper portion $a$ thereof has become saturated with Ca in exchange for Na-ion because of the preference or affinity of the exchanger for Ca, while the lower portion $b$ of the bed still contains available Na-ion. Consequently, the juice leaving the bed is free of Ca but contains Na and K.

The juice then enters the second cation exchanger stage or bed the intermediate condition of which is designated as $C_{22}$. Originally this bed was regenerated in the H-ion cycle whereby it has adsorbed H-ion available for exchange, but in the intermediate condition $C_{22}$ the upper portion $c$ of the bed is saturated with Na and K-ion in exchange for H-ion yielded, while the lower portion $d$ still contains H-ion available for exchange. The juice leaving the bed is free of Ca, K and Na, but contains the molar equivalent of these ions in hydrochloric acid formed as the net result of this cation exchange. The hydrochloric acid in turn can be replaced with its molar equivalent of $H_2O$ by means of treating the juice in a subsequent anion exchanger station (not shown).

Fig. 5 shows the regeneration of the two cation exchanger stages or beds after the same have become exhausted due to the saturation of the first bed with Ca, and of the second bed with Na and K. A suitable auxiliary regenerant solution such as NaCl is sent through the first bed in order to restore Na-ion therein in exchange for Ca. The condition of the bed, as shown in Fig. 5, is an intermediate one and designated as $C_{23}$. That is to say, the upper portion $e$ of the bed in that condition is regenerated with Na-ion, while the lower portion still contains the previously adsorbed Ca-ion. The spent liquor flowing from this bed contains $CaCl_2$ as a result of the exchange of Na for Ca. The intermediate condition in the regeneration phase of the second stage or exchanger bed in Fig. 5 is designated as $C_{24}$. $H_2SO_4$ is the regenerant solution whereby H-ion are being restored in the exchanger by way of the H-ion cycle. In this condition the upper portion $g$ of the bed is shown to have been regenerated with H-ion, while the lower portion $h$ still contains the previously adsorbed Na and K-ion. The spent regenerant liquor flowing from this bed contains $Na_2SO_4$ and $K_2SO_4$ as a result of the exchange. After the auxiliary regeneration of the first bed with NaCl, and the H-cycle regeneration with $H_2SO_4$ of the second bed have been completed, these beds are then in a condition to be re-used in the saturation phase, that is, in the treatment of the juice, an intermediate condition of which phase is shown in Fig. 4.

We claim:

1. A process of regenerating a bed of hydrogen exchange material in which at least calcium and potassium ions have been collected in exchange for hydrogen ion, which method comprises treating the bed with auxiliary regenerant solution of potassium chloride of sufficient molar concentration to substantially free the bed of calcium cations in exchange for K-ions, completing regeneration of the bed with a regenerant solution of $H_2SO_4$ adapted to form with the Ca-displacing ions a soluble reaction product, and discharging from the bed spent regenerant liquor containing potassium ions exchanged for H-ions.

2. The process of regenerating a bed of hydrogen exchange material in which at least calcium, potassium and sodium ions have been collected in exchange for hydrogen ions, which method comprises treating the bed with an auxiliary regenerant solution of NaCl of sufficient molar concentration to substantially free the bed of Ca-ions in exchange for Na-ions, completing regeneration of the bed with a regenerant solution of $H_2SO_4$ adapted to form with the Ca-displacing ions soluble reaction product, and discharging from the bed spent regenerant liquor containing sodium and potassium ions exchanged for H-ions.

3. The process of regenerating a quantity of hydrogen exchanger material in which have been collected in exchange for H-ions precipitable cations adapted to form with $H_2SO_4$ regenerant solution insoluble reaction products, and non-precipitable cations being adapted to form with $H_2SO_4$ regenerant solution soluble reaction products, which method comprises treating the exchanger material with an auxiliary regenerant solution of sufficient molar concentration to free the exchanger material substantially of said precipitable cations by displacing the same with non-precipitable cations, completing regeneration of the material with a regenerant solution of $H_2SO_4$ adapted to form with the displacing ions soluble reaction product, and discharging from said material spent regenerant liquor containing non-precipitable cations exchanged for H-ions.

4. The process according to claim 3 in which the precipitable cation is Ca.

5. The process according to claim 3 in which the precipitable cation is calcium and the auxiliary regenerant comprises a potassium salt.

6. The process according to claim 3 in which the precipitable cation is calcium, and the auxiliary regenerant comprises a sodium salt.

7. The process according to claim 3 in which the precipitable cation is calcium, and the auxiliary regenerant comprises at least one of the alkali metal salts.

8. The process according to claim 1 in which the precipitable cation is calcium, and the auxiliary regenerant comprises NaCl.

FRANKLIN N. RAWLINGS.
LOUIS DE GEOFROY.